United States Patent [19]
Liu

[11] Patent Number: 5,510,569
[45] Date of Patent: Apr. 23, 1996

[54] STRUCTURE OF CRYSTALLINE BALL WITH ROTARY TYPE

[76] Inventor: Jian H. Liu, No. 2, Alley 202, Kao Fen Rd., Hsin-Chu City, Taiwan

[21] Appl. No.: 353,978

[22] Filed: Dec. 6, 1994

Related U.S. Application Data

[63] Continuation-in-part of Ser. No. 277,303, Jul. 22, 1994.
[51] Int. Cl.$^6$ ........................................ G10F 1/06
[52] U.S. Cl. ................................ 84/95.1; 464/105
[58] Field of Search .................................. 84/94.1, 94.2, 84/95.1, 95.2; 464/102, 104, 105

[56] References Cited

U.S. PATENT DOCUMENTS 4,637,786  1/1987  Maroba et al. ............... 464/102 X
5,081,899  1/1992  Hou et al. ..................... 84/95.2

*Primary Examiner*—Patrick J. Stanzione
*Attorney, Agent, or Firm*—Larson and Taylor

[57] ABSTRACT

The present invention relates to a structure of crystalline ball with rotary type drive. The drive is coupled to and rotates an eccentric shaft. The shaft is coupled to, a sliding block mounted in a groove frame for vertical movement therein. The eccentric shaft and sliding block are connected to the output shaft and an engagement element such that the sliding block can be driven by the eccentric shaft. A swing sick extended to the outside of the wood base rotates and moves up and down to produce a plurality of variations of dynamic phenomena.

5 Claims, 3 Drawing Sheets

5,510,569

STRUCTURE OF CRYSTALLINE BALL WITH ROTARY TYPE

RELATED APPLICATION

This is a continuation-in-part of U.S. patent application 08/277,303 entitled EXTERNAL STRUCTURE OF CRYSTAL BALL DRIVEN BY ECCENTRIC SHAFT, which is incorporated herein by reference.

FIELD OF THE INVENTION

The present invention relates a music ball in which an eccentric shaft is connected to one side of the revolving shaft thereof. By the assembly of a eccentric shaft and a sliding block which are connected to a output shaft and an engagement element, then a sliding block can be driven by the eccentric shaft, so that the swing stick extended to the outside of the wood base can move up and down and rotation, and a plurality of variations of dynamic phenomena are present.

BACKGROUND OF THE INVENTION

In said U.S. patent application 08/277,303, a frame structure is driven by the power of the music ball through the end side of the eccentric shaft, thus the swing stick attached in the frame structure present a dynamic phenomenon of circular swing. One feature of the swing is that it is not a parallel motion, so the structure is not suited for the case of parallel motion.

SUMMARY OF THE INVENTION

According to the aforementioned reason, the inventor of the invention modifies the structure according to the original application U.S. patent application 08/277,303 therefore, the adorement outside the wood base of the present invention can present the dynamic phenomena of swinging up and down and rotating; in the structure an music ball in which the output shaft on one end of the revolving shaft is connected to an eccentric shaft, and a sliding block locating in sliding frame is attached on the end portion with respect to the eccentric shaft, thus the swing sick extended to the outside of the wood base on the sliding block is driven and present the dynamic phenomena of swinging up and down and rotating.

DESCRIPTION OF THE PREFERRED EMBODIMENTS

Figure 1:
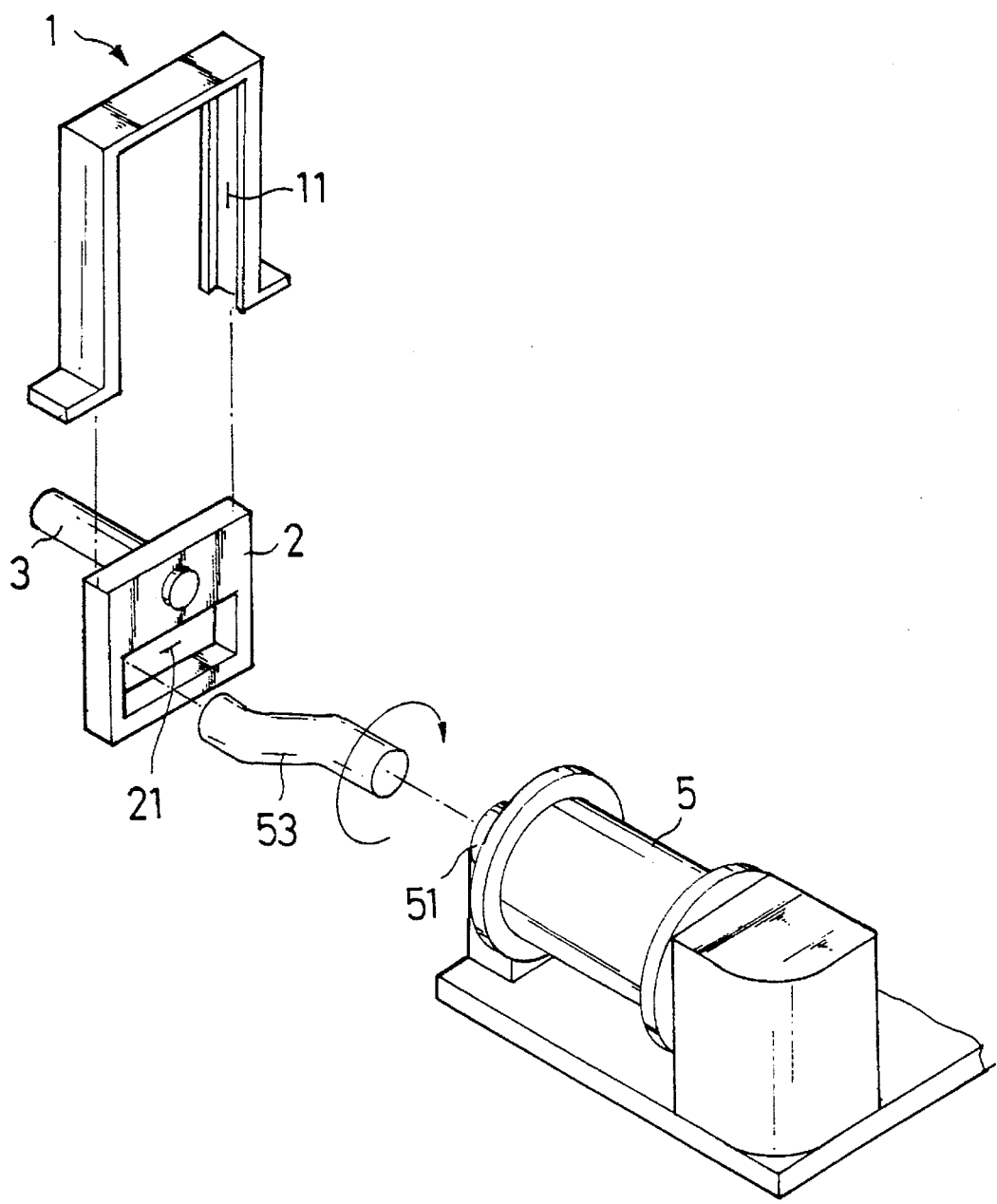
FIG. 1 is a cubic assembly diagram of the invention.
Figure 2:
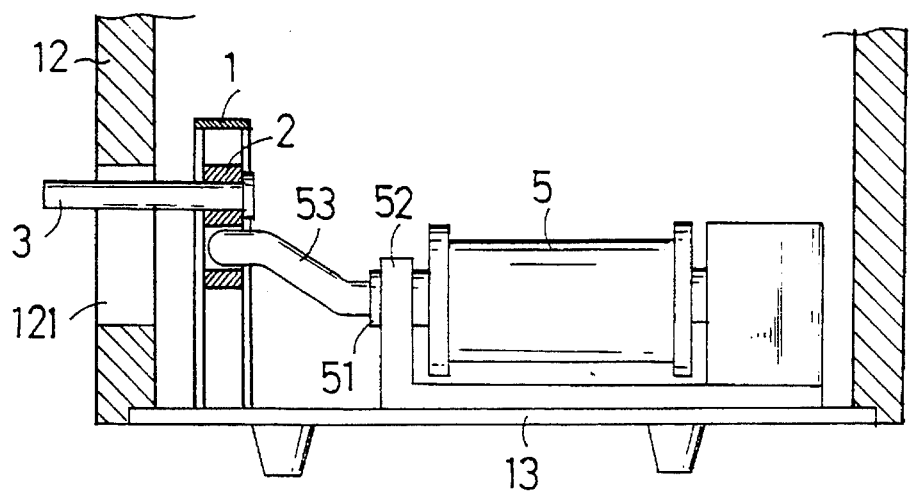
FIGS. 2 and 3 is a sectional diagram in which the sliding block is driven by the eccentric shaft to a state of moving up and down.

As shown in the FIGS. 1 and 2, a base (13) is screwed on the bottom of the wood base (12), and a set of conventional music bell is secured above the base (13). The rotation power of the revolving shaft (5) on the music bell provides the rotary table in the prior application 08/277,303 to a rotation state, in the mean while the output shaft (51) of the end side of the rotary table (5) supported by a supporting arm is connected to an axially eccentric shaft (53) the end side of which is set to a predeterminate arc for presenting a eccentric state, so that the end side of the eccentric shaft (53) is rotated with a predeterminate circular arc.

Furthermore, a groove frame (1) with frame shape is attached on the end portion of said eccentric shaft (53) with respect to the base (13), and in the two internal side thereof is equipped with longitudinally guide tracks (11) in a proper height.

Next, a sliding block (2) is encased between the guide tracks (11) of said groove frame (1), then it can slide up and down freely along the guide track (11) of groove frame (1); and a swing stick (3) horizontally locating near the upper side of the said sliding block (2) is projected from the outside or the wood base (12) through the aperture (121) of the wood base (12). The swing stick is either fixed or rotated freely to the sliding block; and a wane groove (21) which is approximately higher than the diameter of said eccentric axis is provided below said swing stick (3), and the width of the wane groove (21) is approximately wider than the rotation diameter of said eccentric axis.

Figure 3:
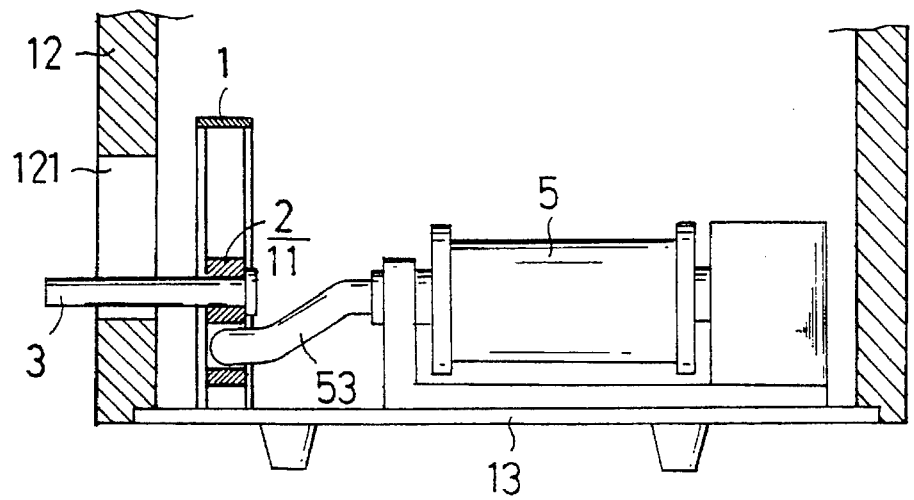

By the assembly of said components, the end portion of the eccentric shaft (53) is located within the range of the wane groove (21). When the eccentric shaft (53) is rotated by the power of the revolving shaft, the end portion of the eccentric shaft is rotated with an predeterminate circular arc, then said sliding block (2) move up and down freely along the guide track (11) of groove frame (1) by the driving force of the eccentric shaft (53). As shown in the FIGS. 2 and 3, if any type of adorement is connected to the external end of the swing stick (3), according to the invention the adorement presents a dynamic phenomenon in which it swings up and down in the outside of the wood base (12).

Figure 4:
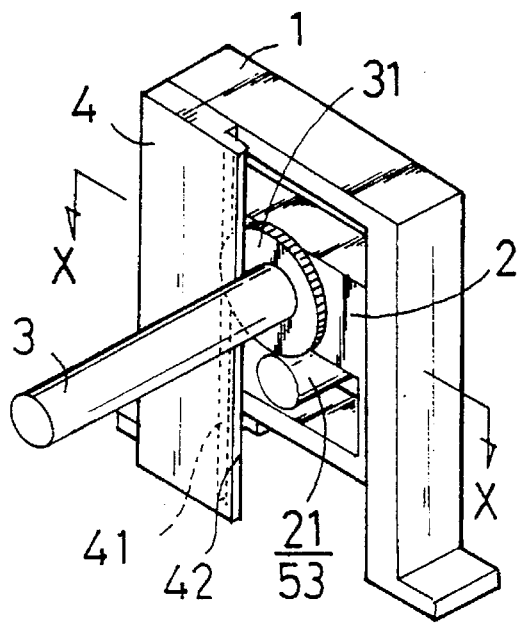
FIG. 4 is the cubic view according to the modified embodiment of the present invention.
Figure 5:
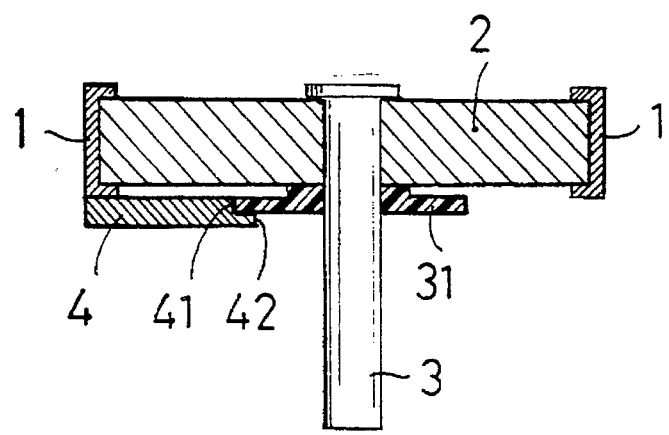
FIG. 5 is a cross section view.

In accordance with the structure described hereinabove, in which the swing stick (3) is rotated freely around the sliding block (2) for the sake of presenting a plurality of variations of dynamic phenomena, as shown in FIGS. 4 and 5, and a gear (31) is secured outside the swing stick (3) near the sliding block (2); moreover, a engagement element (4) is secured to one of the outside of said groove frame (1), and a longitudinal rack portion (41) which is engaged with said gear (31) formed on one outside of the engagement element (4) near the swing stick (3), then the swing stick (3) moves up and down with the motion of sliding block (2), and the gear (31) is driven to rotate, so that the swing stick (3) also follows.

When the swing stick (3) is rotated around the sliding block (2), in order to prevent that the swing stick slips off from the sliding block, a stop (42) with convex shape is formed on the outside of the rack portion (41) of the engagement element (4), so that the gear is stopped by the stop (41) for preventing to slip off from the outside direction.

According to the aforementioned description, by the assembly of an eccentric shaft and a sliding block which are connected to the output shaft and an engagement element, therefore, the swing sick extended to the outside of the wood base can move up and down and rotation, and a plurality of variations of dynamic phenomena is present in the present invention.

What is claimed is:

1. A structure of crystalline ball with rotary type motion, comprising:

an eccentric shaft;

a groove frame having a frame shape with two internal sides is attached on the end portion of said eccentric shaft, and in the two internal sides thereof are longitudinally extending guide tracks having a proper height; and a sliding block mounted between the guiding tracks of a groove frame, said block can slide up and down freely along the guide track; and a swing stick located near the upper side of the said sliding block, and a wane groove is provided below said swing stick.

2. The structure as claimed in claim 1 in which the outer portion of said swing stick is projected from the outside of said wood base through the aperture thereof.

3. The structure as claimed in claim 1 in which Said swing stick is either fixed or rotated freely to the sliding block.

4. The structure as claimed in claim 1 in which the end portion of said eccentric shaft is located within the range of said wane groove.

5. The structure as claimed in claim 1 in which said wane groove is approximately higher than the axial diameter of said eccentric axis, and is also approximately wider than the rotation diameter of said eccentric axis.

* * * * *